US012665810B1

(12) United States Patent
Delp et al.

(10) Patent No.: US 12,665,810 B1
(45) Date of Patent: Jun. 23, 2026

(54) PORT SPEED OPTIMIZATION FOR A NETWORK CONNECTION

(71) Applicant: Amazon Technologies, Inc., Seattle, WA (US)

(72) Inventors: Denny Drivas Delp, Austin, TX (US); Eric Norman Johnson, Mahone Bay (CA); Peter Willis Lane, San Francisco, CA (US)

(73) Assignee: Amazon Technologies, Inc., Seattle, WA (US)

( * ) Notice: Subject to any disclaimer, the term of this patent is extended or adjusted under 35 U.S.C. 154(b) by 116 days.

(21) Appl. No.: 18/540,891

(22) Filed: Dec. 15, 2023

(51) Int. Cl.
  *H04L 41/082* (2022.01)
  *H04L 41/0893* (2022.01)
  *H04L 43/50* (2022.01)

(52) U.S. Cl.
  CPC ........ *H04L 41/082* (2013.01); *H04L 41/0893* (2013.01); *H04L 43/50* (2013.01)

(58) Field of Classification Search
  None
  See application file for complete search history.

(56) References Cited

U.S. PATENT DOCUMENTS

2002/0133631 A1* 9/2002 Yun ........................... H04L 9/40
                                                       709/251
2004/0122952 A1* 6/2004 Kistler ................ H04L 12/5692
                                                       709/227
2007/0192505 A1* 8/2007 Dalmia ................. H04L 5/1446
                                                       709/233
2009/0097401 A1* 4/2009 Diab ...................... H04L 5/0091
                                                       370/230
2019/0104085 A1* 4/2019 Smart .............. H04L 12/40195
2021/0006992 A1* 1/2021 Keaton ................... H04L 43/50

OTHER PUBLICATIONS

"Baliga", Energy Consumption in Wired and Wireless Access Network IEEE, 2011 (Year: 2011).*

* cited by examiner

*Primary Examiner* — Fadi Haj Said
(74) *Attorney, Agent, or Firm* — Kilpatrick Townsend & Stockton LLP

(57) ABSTRACT

Techniques for port speed optimization for a network connection are described. In an example, a computer system sends, to a network node communicatively coupled with a device, first information indicating first network connection speeds supported by a port of the device and selects a first network connection speed of the first network connection speeds to use as a setting of the port. The computer system determines an actual network connection speed of the port based on traffic from the device or received from the network node and selects a second network connection speed of the first network connection speeds based on the actual network connection speed. The second network connection speed is faster or equal to the actual network connection speed and is slower than the first network connection speed. The computer system changes the setting of the port to the second network connection speed.

17 Claims, 11 Drawing Sheets

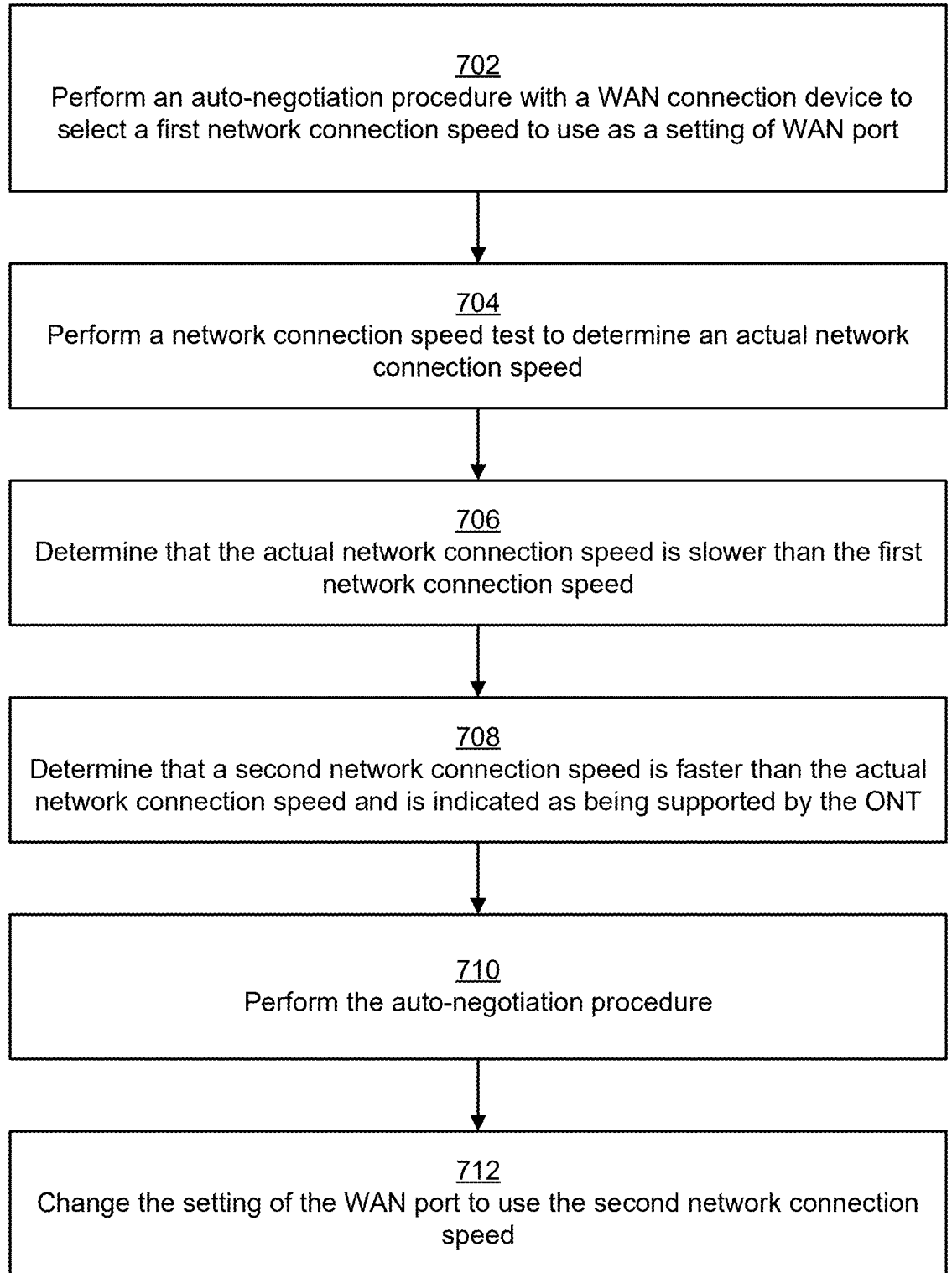

<u>702</u>
Perform an auto-negotiation procedure with a WAN connection device to select a first network connection speed to use as a setting of WAN port <u>704</u>
Perform a network connection speed test to determine an actual network connection speed <u>706</u>
Determine that the actual network connection speed is slower than the first network connection speed <u>708</u>
Determine that a second network connection speed is faster than the actual network connection speed and is indicated as being supported by the ONT <u>710</u>
Perform the auto-negotiation procedure <u>712</u>
Change the setting of the WAN port to use the second network connection speed

FIG. 7

PORT SPEED OPTIMIZATION FOR A NETWORK CONNECTION

BACKGROUND

Various types of computer networks are available to connect devices. For example, a local area network (LAN) links multiple devices to form a local area network within a relatively small geographic area such as within a home or an office building. A wide area network (WAN) is another example of a computer network that spans a larger geographic area and that connects LANs and other types of networks so that users and devices can communicate over different networks. The various types of computer networks enable the connected devices to transmit traffic data at different data rates.

BRIEF DESCRIPTION OF THE DRAWINGS

Various embodiments in accordance with the present disclosure will be described with reference to the drawings, in which:

FIG. 7 illustrates an example of a flow for a process of port speed optimization for a network connection according to embodiments of the disclosure;

DETAILED DESCRIPTION

Figure 1:
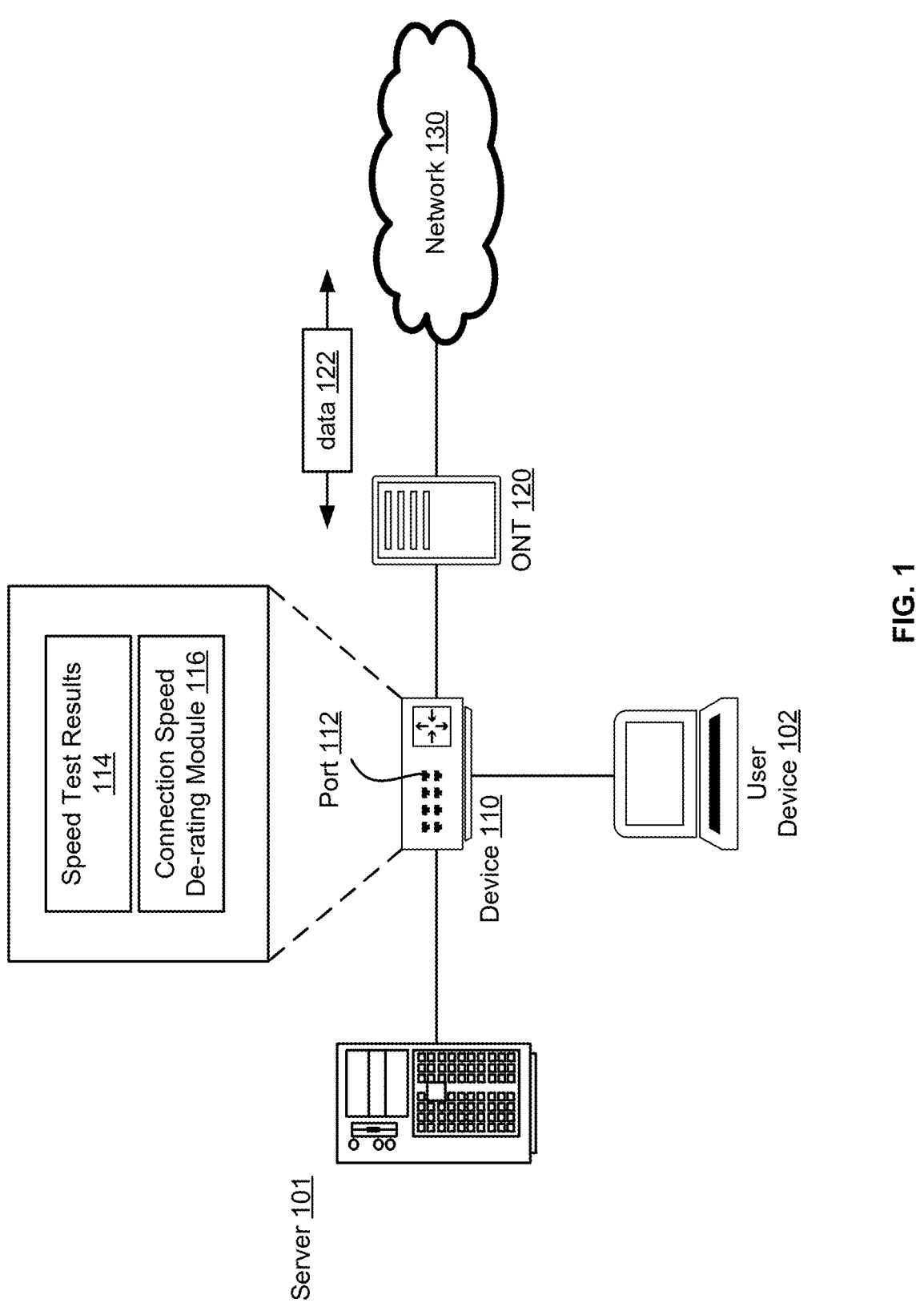
FIG. 1 illustrates an example of port speed optimization for a network connection, according to embodiments of the present disclosure.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Embodiments of the present disclosure relate to port speed optimization for a network connection. In an example, a first device (e.g., a network gateway) is coupled with a network via a second device (e.g., an optical network terminal). In particular, a first port of the first device can be connected (e.g., via an Ethernet cable) to a second port of the second device. The network connection speed (e.g., data throughput or data rates) for data to and from the network can depend on a number of factors, including the network connection speeds that the first port supports, the network connection speeds that the second port supports, and, in the case of a public network, an Internet service provider (ISP) subscription that sets a network connection speed limit. However, the first device and the second node can select to use a particular network connection speed (e.g., via an auto-negotiation procedure according to the Institute of Electrical and Electronics Engineers (IEEE) 802.3 standard). This particular network connection speed is used as a setting of the first port, such that the first device is configured to use the particular network connection speed for its data exchange with the network via the second device. In certain situation, the network connection speed can be faster (e.g., has a larger value) than the network connection speed limit (e.g., the one set by the ISP subscription in the use case of a public network). As a result, the setting of the first port can be sub-optimal because this setting may necessitate unneeded processing by the port, causing unneeded power consumption (e.g., power waste). Embodiments of the present disclosure can address such a challenge and optimize the setting of the first port.

In an example, the first device initially sends, to the second, first information indicating first network connection speeds (e.g., data throughputs or data rates such as 1 Gbps, 2.5 Gbps, 5 Gbps, 10 Gbps, etc.) supported by the first port. The first device receives second information from the second device indicating second network speeds that the second device supports via its second port (e.g., 1 Gbps, 2.5 Gbps, 5 Gbps, etc.). The first device then selects a first network connection speed (e.g., the fastest network connection speed supported by both devices, such as 5 Gbps) to use as the setting of the first port. This initial information exchange and network connection speed selection can be performed according to the negotiation procedure in which all the supported network connection speeds are advertised (e.g., the IEEE 802.3 auto-negotiation procedure). However, at this point, the first device is configured to use the first network connection speed, whereby the setting of the first port may be sub-optimal. To optimize this setting and reduce the power consumption of the first device (e.g., based on a mode of the first device being activated, where this mode is associated with reducing the power consumption), the first device determines an actual network connection speed (e.g., 2 Gbps) of data subsequently exchanged with the network via the second device (e.g., by performing a set of network connection speed tests). The first device then selects a second network connection speed of the first network connection speeds based on the actual network connection speed. The second network connection speed (e.g., 2.5 Gbps) is faster than or equal to the actual network connection speed and is slower than the first network connection speed. The first device sends, to the second device, second information indicating that the second network connection speed is to be used (e.g., by performing the negotiation procedure again, but indicating this time that the device only supports the second network connection speed or only supports the second network connection speed and network connection speed(s) slower than the second network connection speed). The first device is then configured to use the second network connection speed by at least, for example, changing the setting of the port to the second network connection speed.

The first network connection speed is associated with a first power consumption level of the first device (where this level can be estimated or measured in a laboratory environment). Likewise, the second network connection speed is associated with a second power consumption level of the first device (where this level can also be estimated or measured in a laboratory environment). Because the second network connection speed is slower than the first network connection speed, the second power consumption level is smaller than the first power consumption level (since the first device processes a smaller amount data within a unit of time at the second network connection speed relative to the first network connection speed). As such, by configuring the first device to use the second network connection speed, the first device can reduce its power consumption. Configuring the first device to do so can be possible when the device is operating in the mode associated with reducing the power consumption (e.g., this mode is activated).

To illustrate, consider an example of a gateway that includes a wide area network (WAN) port connected to an optical network terminal (ONT). The WAN port supports multiple network connection speed settings including 1 Gbps, 2.5 Gbps, 5 Gbps, and 10 Gbps. The gateway has access to the Internet via the WAN port and the ONT. This access can be managed by an ISP subscription limiting the upload and download speeds to a maximum of 2 Gbps. Upon being powered ON, the gateway performs the IEEE 802.3 auto-negotiation procedure with the ONT and determines that a maximum network connection speed supported by the ONT is 10 Gbps. As a result, the gateway selects to use the 10 Gbps setting of the WAN port. The gateway can then perform three network connection speed tests (e.g., one every other day) to determine actual network connection speeds. Based on determining that the highest actual network connection speed is 1.8 Gbps and the next highest network connection speed supported by the ONT is 2.5 Gbps, the gateway selects the 2.5 Gbps setting of the WAN port. The gateway also performs the IEEE 802.3 auto-negotiation procedure again. But this time, the gateway sends information to the ONT indicating that the gateway supports only the 2.5 Gbps setting. From that point no, the WAN port is set to 2.5 Gbps for subsequent uplink and downlink data.

Embodiments of the present disclosure provide several technical advantages over conventional systems. For instance, a conventional device may use the maximum network connection speed that it can supports and that the network node supports, regardless of any actual limit that can restrict the network connection speed. Accordingly, the conventional device can consume more power than necessary. Techniques described herein allow the optimization of the network connection speed setting in order to reduce the power consumption and without impacting the data throughput that the device can actually achieve.

For simplicity, the figures are described in relation to a particular type of devices (e.g., a gateway). However, other types of devices are possible, such as a router, a modem, or any other network node. Further, the embodiments describe a device performing various operations (e.g., a negotiation procedure, network connection speed tests, network connection speed selections, etc.). However, the embodiments are not limited as such. Instead, the embodiments similarly and equivalently apply to a distributed architecture. For example, the device may run the network connection speed tests and send the network connection speed test results to a computing resource (e.g., a cloud computing service, or a server or another device on the same or a different local area network to which the device belongs). The computing resource collects the network connection speed test results, makes decisions about changing the network connection speed setting of a port of the device, and informs the device about the change.

FIG. 1 illustrates an example of port speed optimization for a network connection, according to embodiments of the present disclosure. A device 110 (e.g., a gateway) is connected to a server 101 (e.g., a local media server), a user device 102 (e.g., a laptop, a smartphone, a smart speaker, an internet of things (IoT) device, a sensor, or any other device), and an optical network terminal (ONT). The device 110, the server 101, and the user device can belong to a same local area network (LAN) and the connections therebetween can be wired and/or wireless. The device 110 is also coupled with a remote network 130 (e.g., a wide area network, including for example, the Internet) via the ONT 120. While the ONT 120 is described in FIG. 1, the device 110 can generally be connected to the network 130 via any suitable network terminal. The network 130 may be a public network like the Internet supported by an Internet service provider. The ONT 120 (e.g., a port thereof) is connected to a port 112 of the device 110, which may be a wide area network (WAN) port of the device 110. In some instances, the device 110 includes, in addition to the WAN port, one or more LAN ports. The WAN port can be the port 112 that is connected to the ONT 120 and the LAN port can be connected to the server 101 and/or the user device 102. Generally, the device includes Ethernet ports. When an Ethernet port is connected with the ONT 120, this Ethernet port can be considered as a WAN port. When an Ethernet port is connected with any other node of the LAN, this Ethernet port can be considered as a LAN port.

In an example, the device 110 and the ONT 120 perform a negotiation procedure to determine a network connection speed to use as a setting of the port 112. The auto-negotiation procedure can be an IEEE 802.3 auto-negotiation procedure. The negotiation procedure can involve the device 110 sending (e.g., advertising) information to the ONT 120 about the network connection speeds (e.g., one Gbps, 2.5 Gbps, five Gbps, ten Gbps) that the port 112 supports (e.g., about all the possible network connection speeds of this port 112). The ONT 120 also sends information to the device 110 about the network connection speeds that the ONT 120 supports (e.g., about all the possible network connection speeds of the ONT's 120 port connected to the port 112). The device 110 selects a maximum network connection speed supported by the device 110 and the ONT 120 as the network connection speed to use as a setting of the port 112. However, an ISP subscription associated with access of the LAN to the network 230 can limit the maximum actual connection speed (e.g., to 500 Mbps, 1 Gbps, etc.). This limit can be less than the network connection speed that is negotiated between the device 110 and the ONT 120 and used as the setting of the port 112. As result, the setting based on the negotiated network connection speed can result in unnecessary power consumption by the device 110.

In an example, the device 110 performs one or more network connection speed tests to generate speed test results 114. For example, according to each network connection speed test, the device 110 sends to and receives data from the network 130 via its port 112 and the ONT 120. The device 110 can then measure the uplink throughput and downlink throughput. The network connection speed test result can include the uplink throughput, the downlink throughput, or the maximum of both throughputs. From the speed test results 114, the device 110 determines an actual network connection speed (e.g., the maximum of all measured data throughputs). A connection speed de-rating module 116 of the device 110 can then determine if the actual network connection speed is slower than the negotiated network connection speed (e.g., the network connection speed setting of the port 112). If the connection speed de-rating module 116 determines that the actual network connection speed is slower than the negotiated network connection speed, the device 110 (e.g., the connection speed de-rating module 116 can determine) the closest network connection speed that is supported by the port 112 and the ONT 120 and that is faster than or equal to the actual network connection speed. This second network connection speed is slower than the negotiated network connection speed and can be considered to be a de-rated network connection speed. As an example, the negotiated network connection speed may be 10 Gbps and the actual network connection speed may be 2 Gbps. The closest network connection speed that is supported by the port 112 and the ONT 120 may be 2.5 Gbps. So, the device 110 selects 2.5 Gbps as the network connection speed setting of the port 112. The device 110 can perform the auto-negotiation procedure again by sending information about the port 112 supporting only the second network connection speed (e.g., 2.5 Gbps) to the ONT 120. Alternatively, the auto-negotiation procedure again can be performed again, where the device 110 sends information indicating that the port 112 supports the second network connection speed and the remaining slower network connection speeds (e.g., that the port 112 supports 1 Gbps and 2.5 Gbps). In both these implementations, the device 110 sends information indicating that the fastest speed that the port 112 supports is the second network connection speed. The setting of the port 112 is then changed to use the second network connection speed instead of the originally negotiated network connection speed. Continuing with the example, the device 110 changes the setting of the port 112 to use 2.5 Gbps.

In an example, if the port 112 is a WAN port and the device 110 also includes a LAN port, the auto-negotiation of the port 112 can be independent of any auto-negotiation of the LAN port. That is, de-rating the network connection speed of the port 112 may not affect the network connection speed of the LAN port. Alternatively, de-rating the network connection speed of the port 112 may cause the network connection speed of the LAN port to also be de-rated. For instance, the device 110 can perform another auto-negotiation procedure between the device 110 and the other device that is connected therewith via the LAN port (e.g., the user device 102). This auto-negotiation procedure involves the device 110 sending information about the LAN port supporting the second network connection speed (e.g., 2.5 Gbps) as the fastest network connection speed to the other device. The device 110 then changes a setting of the LAN port to use the second network connection speed.

In an example, the original auto-negotiation procedure for a port of the device 110 (e.g., the WAN port or a LAN port) can be performed based on a trigger event. Different trigger events are possible, such as a power ON of the device 110, a device reboot, a device firmware update of the device 110, a re-plugging of a network cable into the port, or a disablement of an operational mode of the device 110. In comparison, the second auto-negotiation procedure for the port can be determined based on another trigger event. One example of such a trigger event is a time-based event. For example, a user setting of the device 110 can indicate a time window during which the network connection speed tests can be performed. The second auto-negotiation procedure is performed during this time window. In another example of such a trigger event, a device activity trigger can be used. For example, the device 110 can measure the amount of data sent from or receive via this port and determine that the amount has a value smaller than a threshold value. The amount of data being smaller than the threshold value can indicate that the port is idle. Additionally, or alternatively, the device 110 can maintain information indicating a status of the port. This information can indicate that the port is idle. Accordingly, the auto-negotiation procedure can be performed.

Although FIG. 1 illustrates an implementation that involves an ONT, the embodiments of the present disclosure are not limited as such. The ONT is an example of a WAN connection device that provides WAN connectivity based on fiber optics technology. Generally, a WAN connection device can provide WAN connectivity using other fiber optics technology and/or other technologies, such as copper-based wired technologies and wireless technologies. The embodiments similarly and equivalently apply to any type of WAN connection devices and/or any device that connects one network to another network or that inter-connects devices within a same network.

Furthermore, although various embodiments are described in connection with the IEEE 802.3 standard and Ethernet-based connectivity, the embodiments of the present disclosure are not limited as such. Instead, the embodiments similarly and equivalently apply to any type of multi-rate connectivity technologies, which may support wired and/or wireless connectivity, and which enable the rate (or network connection speed) of the connection between two devices, a device and a network, or two networks to change. The embodiments enable the optimization of the network connection speed, while also reducing the power consumption.

Figure 2:
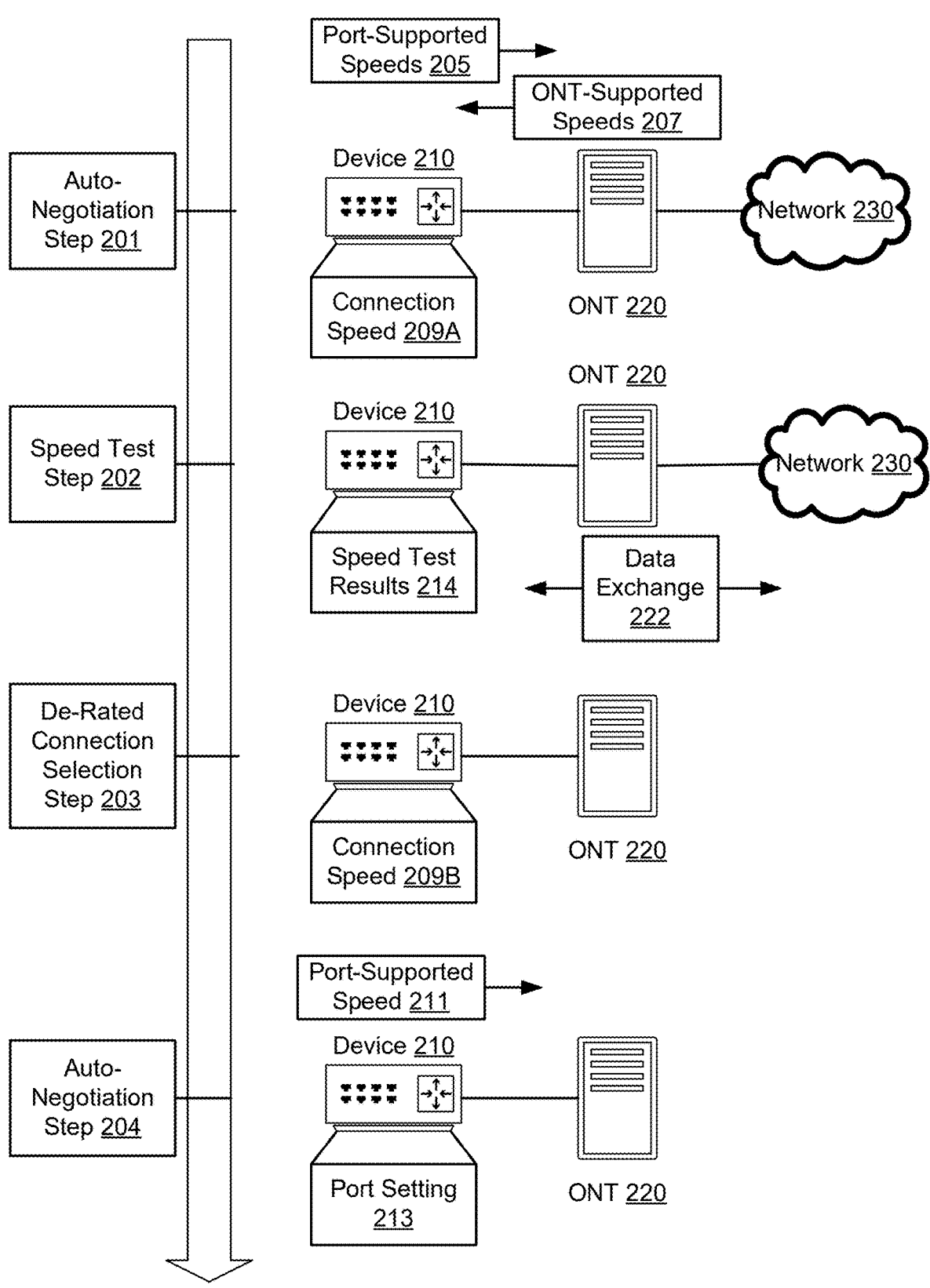
FIG. 2 illustrates an example of steps involved in port speed optimization for a network connection according to embodiments of the present disclosure.

FIG. 2 illustrates an example of steps involved in port speed optimization for a network connection according to embodiments of the present disclosure. The steps include an auto-negotiation step 201, a speed test step 202, a de-rated connection selection step 203, and an auto-negotiation step 204.

In an example, the auto-negotiation step 201 involves performing an auto-negotiation procedure between a device 210 and an ONT 220 according to the IEEE 802.3 standard. The device 210 (e.g., a gateway) sends information about port-supported speeds 205 to the ONT 220 (e.g., the network connection speed setting that a WAN port of the device 210 supports). The port-supported speeds 205 are network connection speeds that are supported by a port of the device 210 that is communicatively coupled to a network 230 via the ONT 220. The device 210 also receives information about ONT-supported speeds 207 from the ONT 220. The ONT-supported speeds are network connection speeds that are supported by the ONT's 220 port connected to the device 210 (e.g., the network connection speed setting that the port of the ONT 220 supports). The device 210 then determines a fastest network connection speed that is indicated in the port-supported speeds 205 and the ONT-supported speeds 207. A setting of the port of the device 210 is set to use the fastest network connection speed as a connection speed 209A between the port and the ONT 220.

In an example, the speed test step 202 involves performing a network connection speed test after the auto-negotiation procedure. The network connection speed test determines an actual network connection speed based on a data exchange 222 between the device 210 and the network 230 via the device's 210 port and the ONT 220. Network connection speed tests can be scheduled according to a predefined time interval (e.g., forty-eight hours). After each network connection speed test, the device 210 stores the value for the actual network connection speed determined during the network connection speed test in a memory of the device 210 as speed test results 214. So, for a first network connection speed test performed after the auto-negotiation procedure, the device 210 determines and stores the actual network connection speed as a first value of speed test results 214 in the memory.

In an example, the de-rated connection selection step 203 involves the device 210 selecting a connection speed 209B based on the speed test results 214. To do so, the device 210 can determine whether a minimum number (e.g., three) of network connection speed tests has been performed based on the speed test results 214. For instance, the device 210 may determine if the minimum number of values for actual network connection speeds are stored in the memory. If the minimum number of network connection speed tests has been performed, the device 210 retrieves the values of the speed test results 214 from the memory and determines the connection speed 209B to be the slowest network connection speed that is supported by the port and that has a value larger than the highest value in the speed test results 214. For instance, if the largest value in the speed test results 214 is 4 Gbps and the port supports 1 Gbps, 2.5 Gbps, and 5 Gbps, the device 210 can determine the connection speed 209B to be 5 Gbps.

In an example, the auto-negotiation step 204 involves performing the auto-negotiation procedure between the device 210 and the ONT 220 according to the IEEE 802.3 standard. The device 210 sends information about a port-supported speed 211 to the ONT 220. Here, the information about port-supported speed 211 can indicate that the device 210 only supports the network connection speed 209B for its port. Alternatively, the information about port-supported speed 211 can indicate that the device 210 supports the network connection speed 209B and the remaining slower network connection speeds. In both these implementations, the information about port-supported speed 211 can indicate that the fastest speed that the device 210 supports is the network connection speed 209B. The device 210 then changes the port setting 213 of the port to use the connection speed 209B.

Figure 3:
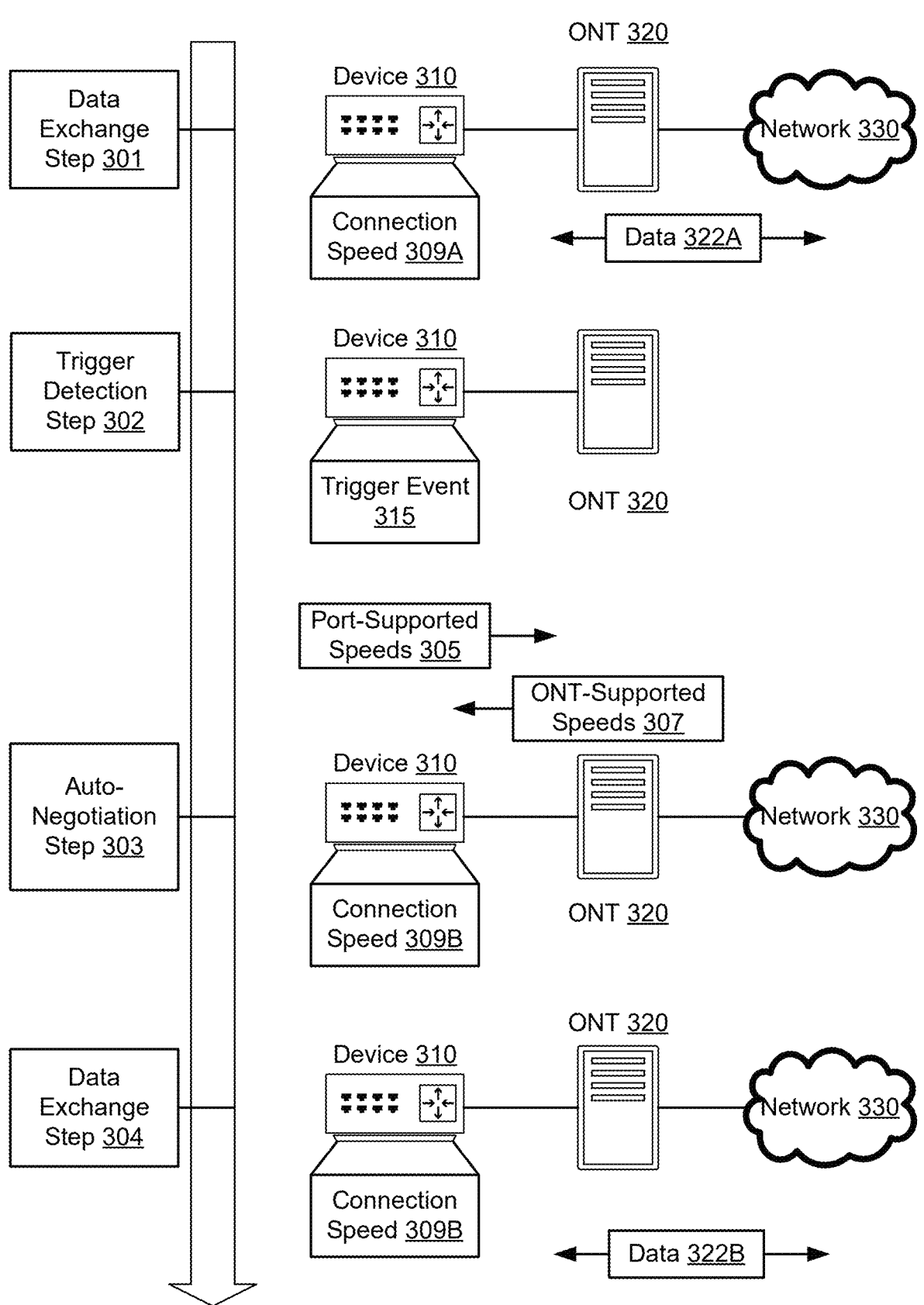
FIG. 3 illustrates an example of steps involved in resetting a port speed for a network connection according to embodiments of the present disclosure.

FIG. 3 illustrates an example of steps involved in resetting a port speed for a network connection according to embodiments of the present disclosure. The steps include a data exchange step 301, a trigger detection step 302, an auto-negotiation step 303, and a data exchange step 304.

In an example, the data exchange step 301 involves data 322A being exchanged between a device 310 (e.g., a gateway) and a network 330 via an ONT 320 and a port of the device 310 to which the ONT 320 is coupled. The data 322A is exchanged at a connection speed 309A that represents a de-rated network connection speed. This de-rated network connection speed may have been determined by the process shown in FIG. 2. In an example, the device 310 may be capable of using the de-rated network connection speed because the device 310 is set to operate in a particular operational mode (e.g., an eco-friendly mode or a power saving mode) that enables such a use. A setting of the port is set to the connection speed 309A.

In an example, the trigger detection step 302 involves the device 310 detecting a trigger event 315 for ending communication at the de-rated network connection speed. For instance, the trigger event 315 may be a device reboot, a device firmware update, a re-plugging of a network cable into the port, and/or a disablement of the operational mode of the device 310 (e.g., the eco-friendly mode or the power saving mode).

In an example, the auto-negotiation step 303 involves performing an auto-negotiation procedure between the device 310 and the ONT 320 according to the IEEE 802.3 standard. This step 303 is similar to the auto-negotiation step 201 of FIG. 2. In particular, the device 310 sends information about port-supported speeds 305 to the ONT 320. The port-supported speeds 305 can be all the network connection speeds that are supported by the port of the device 310 connected to the ONT 320. The device 310 also receives information about ONT-supported speeds 307 from the ONT 320. The ONT-supported speeds are network connection speeds that are supported by the ONT 320 for the port that connects it to the device 310. The device 310 then determines a fastest network connection speed that is indicated in the port-supported speeds 305 and the ONT-supported speeds 307. The setting of the port is changed to use the fastest network connection speed as a connection speed 309B between the port and the ONT 320 instead of the connection speed 309A.

In an example, the data exchange step 304 involves data 322B being exchanged between the device 310 and the network 330 via the ONT 320 and the port of the device 310 to which the ONT 320 is coupled. The data 322B is exchanged using the connection speed 309B as the setting of the device's 30 port.

Figure 4:
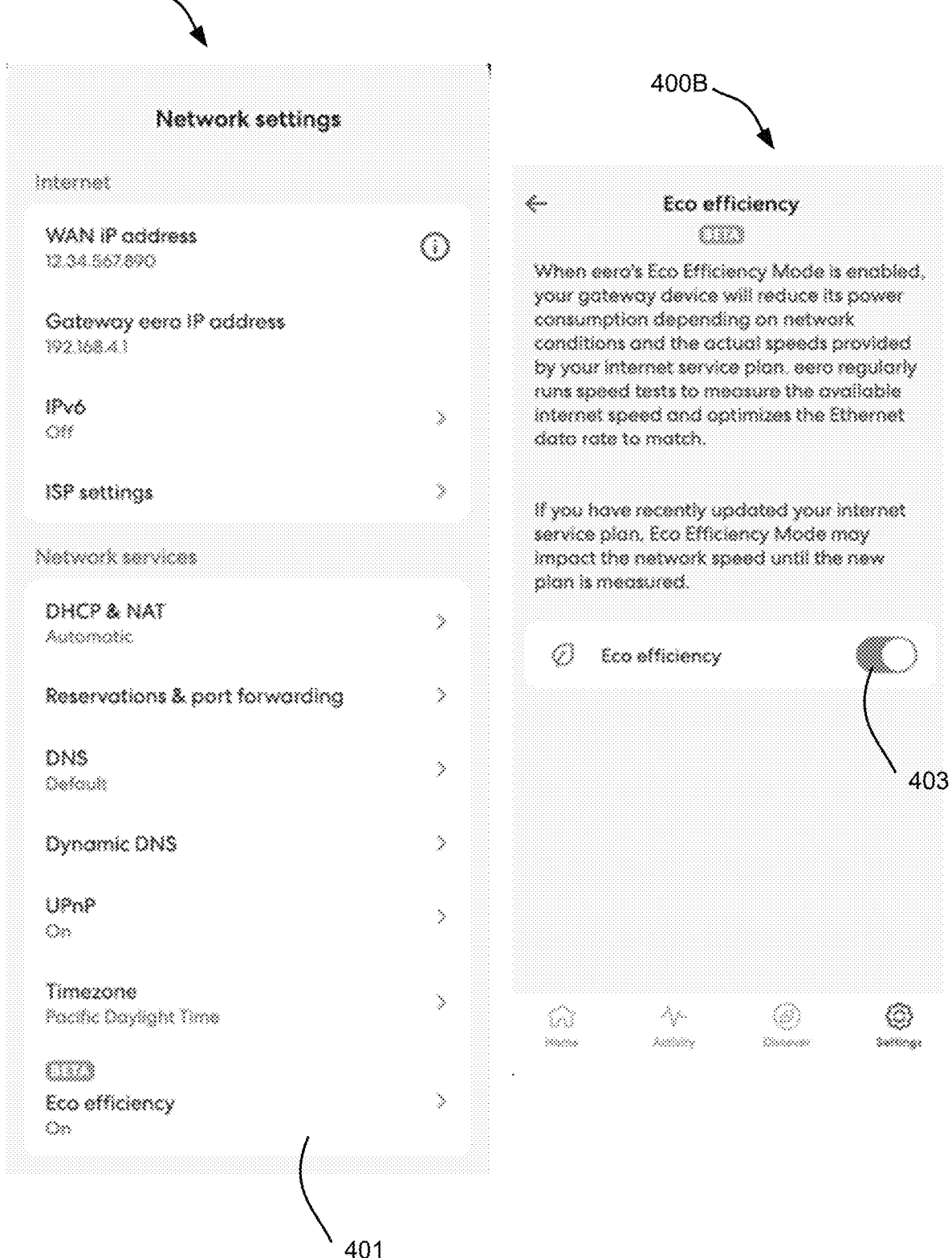
FIG. 4 illustrates examples of user interfaces associated with a device for port speed optimization for a network connection according to embodiments of the disclosure.

FIG. 4 illustrates examples of user interfaces 400A-400B associated with a device for port speed optimization for a network connection according to embodiments of the disclosure. The device is an example of the device 110 in FIG. 1. The user interface 400A can be associated with an application that is presented on the device or a different device (in case of the different device, the two devices can be registered with the same account, and the user interfaces 400A-400B can be presented upon a proper login to the account via the application). For instance, the other device may be a smartphone that is usable by a user to configure settings for the device. The user interface 400A includes a feature 401 that indicates an operational mode of the device. As illustrated, the feature 401 shows that the device is in an eco-efficiency operational mode. The eco-efficiency operational mode is an example of a mode that is associated with reducing the power consumption of the device. When the eco-efficiency operational mode is activated, the device can optimize its network connection speed as described herein, thereby possibly reducing its power consumption.

In an example, the user device can receive a user input of a selection of the feature 401, which causes the user device to present the user interface 400B. The user interface 400B provides information about the eco-efficiency operational mode and a feature 403 for enabling and disabling (e.g., activating and de-activating) the eco-efficiency operational mode. In FIG. 3, the feature 403 is a toggle that can be turned on or off to enable or disable the eco-efficiency operational mode. In the eco-efficiency operational mode, the device can de-rate a network connection speed between itself and a network node that couples the device to a network to reduce a power consumption of the device. The device can select the de-rated network connection speed based on stored speed test results and based on the eco-efficiency operational mode being enabled.

Although not shown in FIG. 4, in an example, a user input indicating a time window during which an auto-negotiation procedure is performable to determine the de-rated network connection speed is received via a user interface of the application. The time window may be a predefined maintenance window or a preset time of day for performing network connection speed tests. For instance, the user input may set the network connection speed tests to occur at 6:00 A.M. every other day. So, the device can perform the auto-negotiation procedure at 6:00 A.M. after a network connection speed test in line with the user setting.

Data resulting from the user inputs (e.g., the selection of the feature 401, the definition of the time window) can stored directly by the device as user setting if the user interfaces are presented by the device. Otherwise, the data can be sent a computing resource (e.g., a cloud service) that then pushes some or all of the data down to the device such that can store the user settings.

Figure 5:
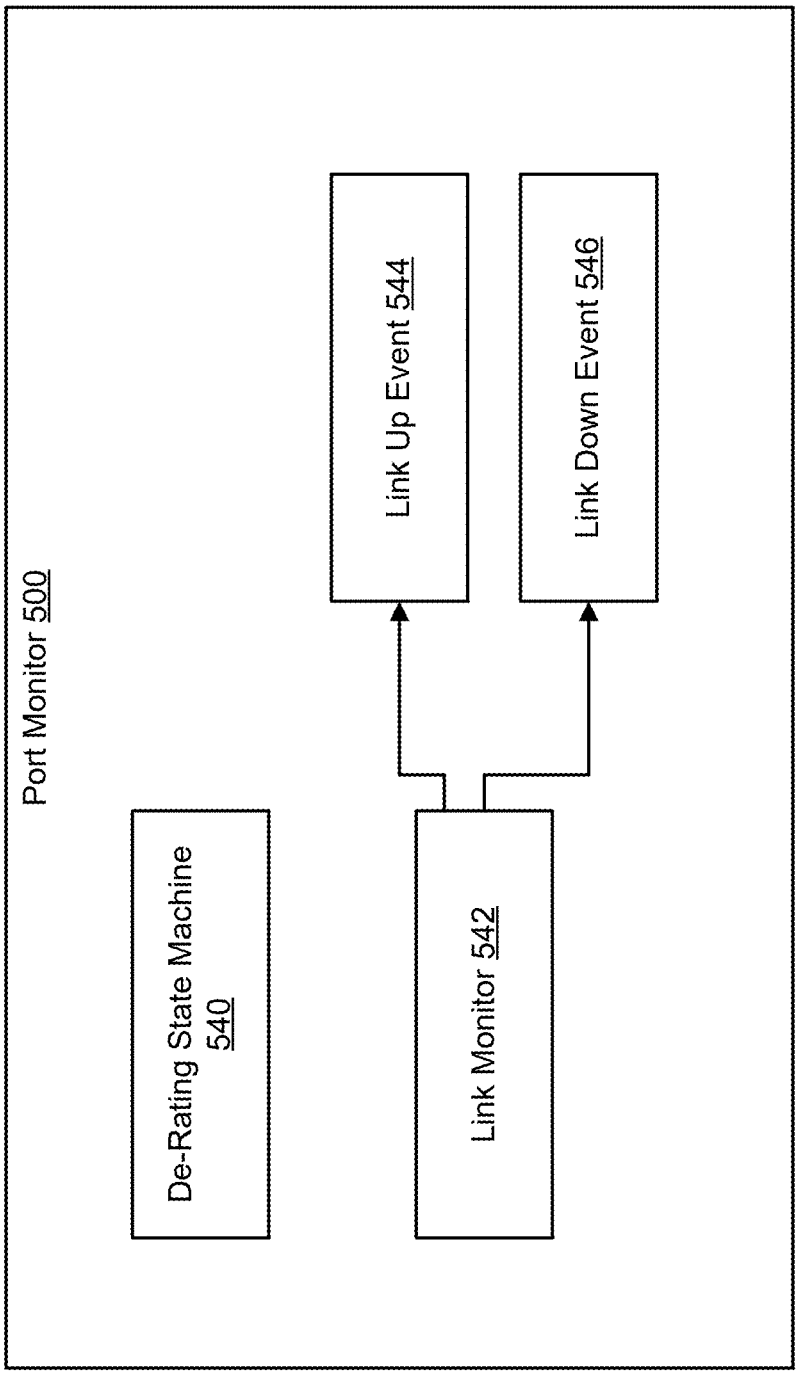
FIG. 5 illustrates an example of a port monitor for de-rating a network connection speed according to embodiments of the present disclosure.

FIG. 5 illustrates an example of a port monitor for de-rating a network connection speed according to embodiments of the present disclosure. A device (e.g., device 110 in FIG. 1) can include a port monitor 500 for monitoring a connection of a port (e.g., port 112 in FIG. 1) of the device to a network. The port monitor 500 can create an instance of a de-rating state machine 540 for de-rating the network connection speed of the port. If the port supports power saving, the de-rating state machine 540 can subscribe to configuration changes and speed test results (e.g., speed test results 114 in FIG. 1). Each port of the device may have a port monitor 500, but the de-rating state machine 540 may, but need not, be only enabled for the port that is coupled to a particular type of networks, such as to a public network (e.g., for a WAN port). The de-rating state machine 540 then runs de-rate checks based on the speed test results.

In an example, the port monitor 500 can include a link monitor 542 that determines a connection of the port to the network. If the port is determined to be connected to the network, the link monitor 542 can notify the de-rating state machine 540 of a link up event 544. In addition, if the port is determined to be disconnected from the network, the link monitor 542 can notify the de-rating state machine 540 of a link down event 546. If the port is de-rated, the de-rating state machine 540 can reset an auto-negotiation procedure and clear in-memory speed test data. Since the de-rating state machine 540 caches speed test results in memory, a power cycle naturally clears the speed tests and resets the de-rating state machine 540.

Figure 6:
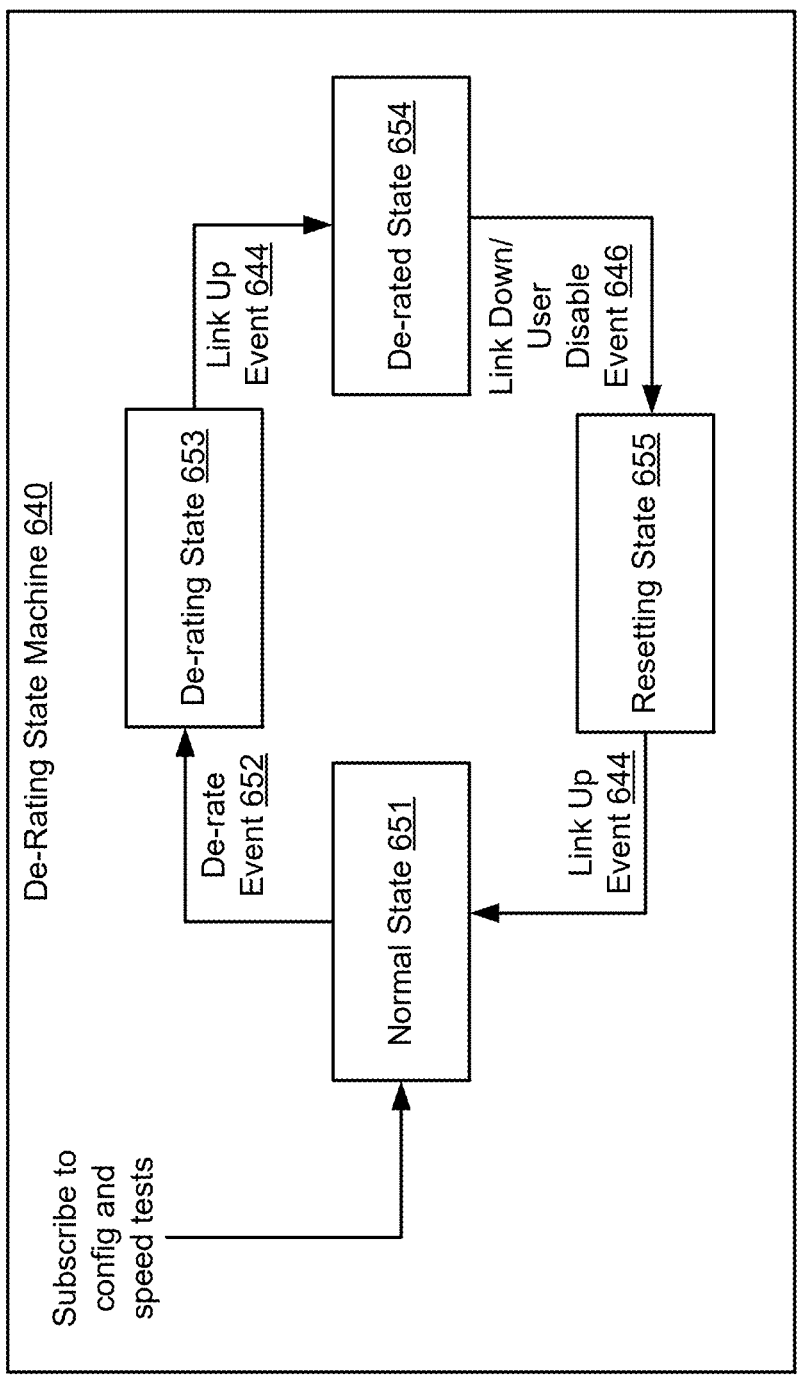
FIG. 6 illustrates an example of a de-rating state machine according to embodiments of the present disclosure.

FIG. 6 illustrates an example of a de-rating state machine 640 according to embodiments of the present disclosure. The de-rating state machine 640 is an example of the de-rating state machine 540 in FIG. 5. The de-rating state machine 640 has four states. A normal state 651 and a de-rated state 654 are steady states where the de-rating state machine 640 spends a majority of its time. The normal state 651 is a state in which a setting of a port (e.g., port 112 in FIG. 1) is set to use a fastest network connection speed that is supported by the port and a network node (e.g., ONT 120 in FIG. 1) coupled to the port. This fastest network connection speed can be determined based on an auto-negotiation procedure. The de-rated state 654 is a state in which the setting of the port is set to use a closest network connection speed supported by the port and the network node to an actual network connection speed. A de-rating state 653 and a resetting state 655 are ephemeral, or transient, states that handle link up events 644 and link down events 646 appropriately while the port is being de-rated or is resetting. The de-rating state 653 is a state in which an auto-negotiation procedure is performed. An analytic event can be posted on each state change, including a reason for the state change reason and a duration of the state.

In an example, a device (e.g., device 110 in FIG. 1) that includes the port can operate in a first state (e.g., the normal state 651) after a fastest network connection speed is selected and while an actual network connection speed is determined, and a de-rated network connection speed is selected. When new speed test results are available and the de-rating state machine 640 is enabled, the de-rating state machine 640 runs a de-rate check as a de-rate event 652. For the port to be de-rated, power optimization may need to be enabled, the port may not already be de-rated, a minimum number of speed tests may need to have already been performed, the maximum up and down speed of all speed test results may need to be less than the de-rate speed, and/or the upstream network node may need to support the desired de-rate speed. The device can operate in a second state (e.g., the de-rating state 653) while the setting of the port is changed to a de-rated network connection speed. After the setting of the port is changed, a link up event 644 occurs and the device is operated in a third state (e.g., the de-rated state 654). No network connection speed tests may be performed while the device is in the third state. Upon the port or power optimization being disabled (e.g., a link down or user disable event 646), the device operates in a fourth state (e.g., the resetting state 655) until the setting of the port is changed to the fastest network connection speed, at which point the link up event 644 occurs and the device operates in the first state again.

If a user opts out of power saving (e.g., the operational mode described in FIG. 4), a computing resource (e.g., a cloud service) can send a new configuration to the device with power optimization disabled. If the power optimization is disabled while the port is de-rated, the port can immediately be auto-negotiated to the maximum network connection speed and the de-rating state machine 640 can be disabled.

FIGS. 7-10 illustrate examples of flows for optimizing a port speed for a network connection. Operations of the flow can be performed by a device, such as the device 110 in FIG. 1. Nonetheless, at least some of the operations can be performed alternatively by any computing resource that is different from the device and that is described herein above. Some or all of the instructions for performing the operations of flows can be implemented as hardware circuitry and/or stored as computer-readable instructions on a non-transitory computer-readable medium of the device. As implemented, the instructions represent modules that include circuitry or code executable by processors of the device. The use of such instructions configures the device to perform the specific operations described herein. Each circuitry or code in combination with the relevant processor(s) represent a means for performing a respective operation(s). While the operations are illustrated in a particular order, it should be understood that no particular order is necessary and that one or more operations may be omitted, skipped, performed in parallel, and/or reordered.

FIG. 7 illustrates an example of a flow for a process of port speed optimization for a network connection according to embodiments of the disclosure. In an example, the flow includes operation 702, where the device performs an auto-negotiation procedure with a WAN connection device (e.g., an ONT) to select a first network connection speed to use as a setting of a WAN port of the device (e.g., as a network connection speed setting). The auto-negotiation procedure can be performed according to the IEEE 802.3 standard and involves the device sending first information about first network connection speeds that the WAN port supports to the WAN connection device. The auto-negotiation procedure also involves receiving second information from the WAN connection device about second network connection speeds that the WAN connection device supports and selecting the first network connection speed from the first network connection speeds as a fastest network connection speed indicated by the second information as being supported by the WAN connection device. The device is configured to use the first network connection speed by at least using the first network connection speed as the setting of the WAN port.

In an example, the flow includes operation 704, where the device performs a network connection speed test to determine an actual network connection speed. The actual network connection speed is determined based on a data exchange between the device and the public network via the WAN port and the WAN connection device. The device may store the actual network connection speed as a value in a memory.

In an example, the flow includes operation 706, where the device determines that the actual network connection speed is slower than the first network connection speed. The device can compare the actual network connection speed to the first network connection speed to determine whether the actual network connection speed has a larger or smaller value than the first network connection speed.

In an example, the flow includes operation 708, where the device determines that a second network connection speed is faster than the action network connection speed and is indicated as being supported by the WAN connection device. The second network connection speed is included in the first network connection speeds and is indicated by the second information. The second network connection speed is slower than the first network connection speed.

In an example, the flow includes operation 710, where the device performs the auto-negotiation procedure. The auto-negotiation procedure is performed at a second time by at least sending third information about the WAN port supporting only the second network connection speed to the WAN connection device or supporting the second network connection speed and remaining slower network connection speed(s).

In an example, the flow includes operation 712, where the device changes the setting of the WAN port to use the second network connection speed. The device is configured to use the second network connection speed by at least using the second network connection speed as the setting of the WAN port. Data can then be exchanged at this changed setting instead of the first network connection speed.

Figure 8:
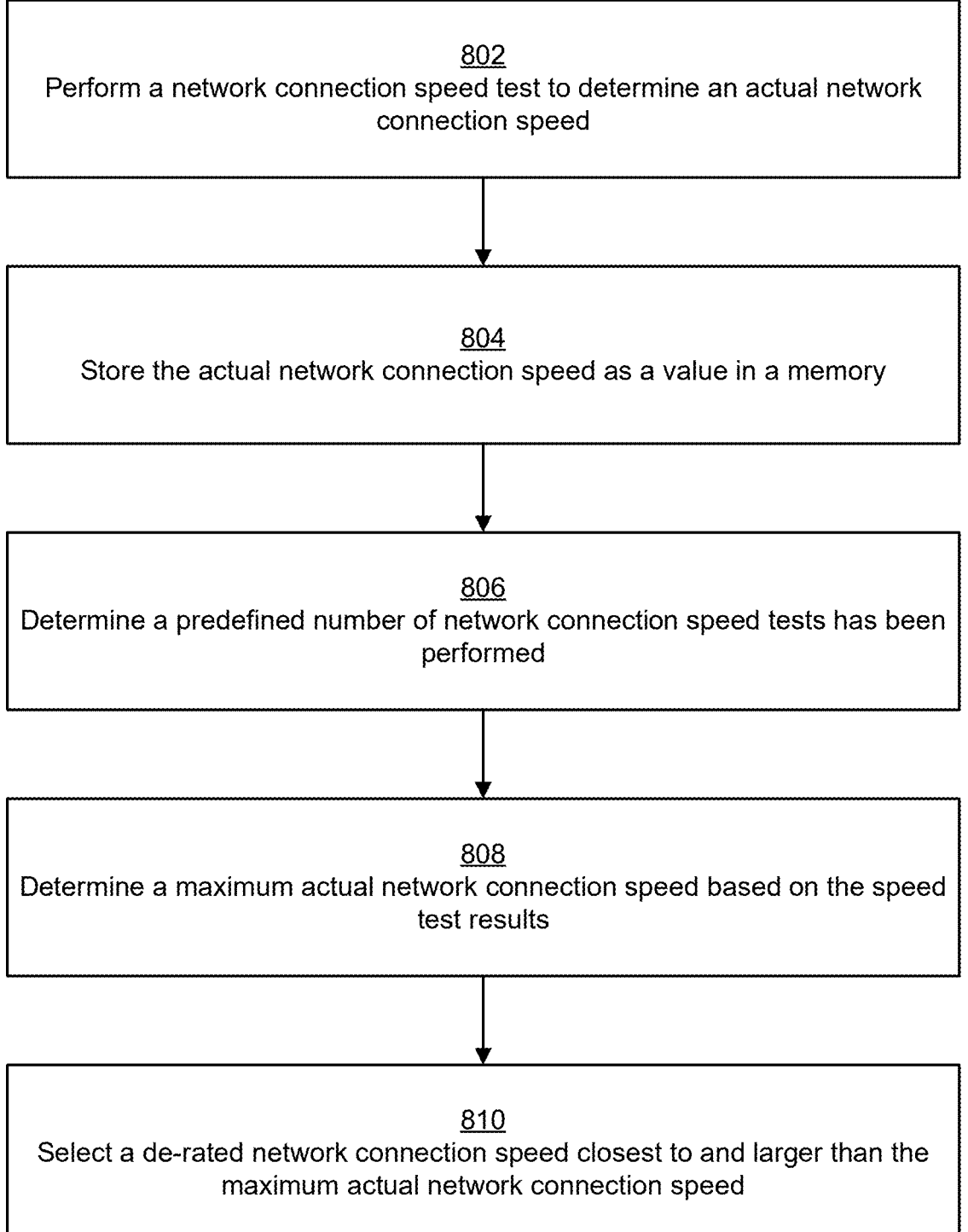
FIG. 8 illustrates an example of a flow for a process of de-rating a network connection speed according to embodiments of the present disclosure.

FIG. 8 illustrates an example of a flow for a process of de-rating a network connection speed according to embodiments of the present disclosure. In an example, the flow includes operation 802, where the device performs a network connection speed test to determine an actual network connection speed. The actual network connection speed is determined based on a data exchange between the device and a network communicatively coupled to the device via a port of the device and a network node. The data exchange happens while a setting for the port is set according to a first network connection speed.

In an example, the flow includes operation 804, where the device stores the actual network connection speed as a value in a memory. The device additionally stores additional actual network connection speeds determined from additional network connection speed tests as values in the memory.

In an example, the flow includes operation 806, where the device determines that a predefined number of network connection speed tests has been completed. The device can determine how many values of actual network connection speeds are stored in the memory and determine if the number of values meets the minimum number.

In an example, the flow includes operation 808, where the device determines a maximum actual network connection speed based on the speed test results. The device can compare each of the values of the actual network connection speeds to determine which value is the maximum value of the actual network connection speed.

In an example, the flow includes operation 810, where the device selects a de-rated network connection speed closest to and larger than the maximum actual network connection speed. The de-rated network connection speed is slower than the first network connection speed. The setting for the port is changed, such that the de-rated network connection speed instead of the first network connection speed is used as the updated setting.

Figure 9:
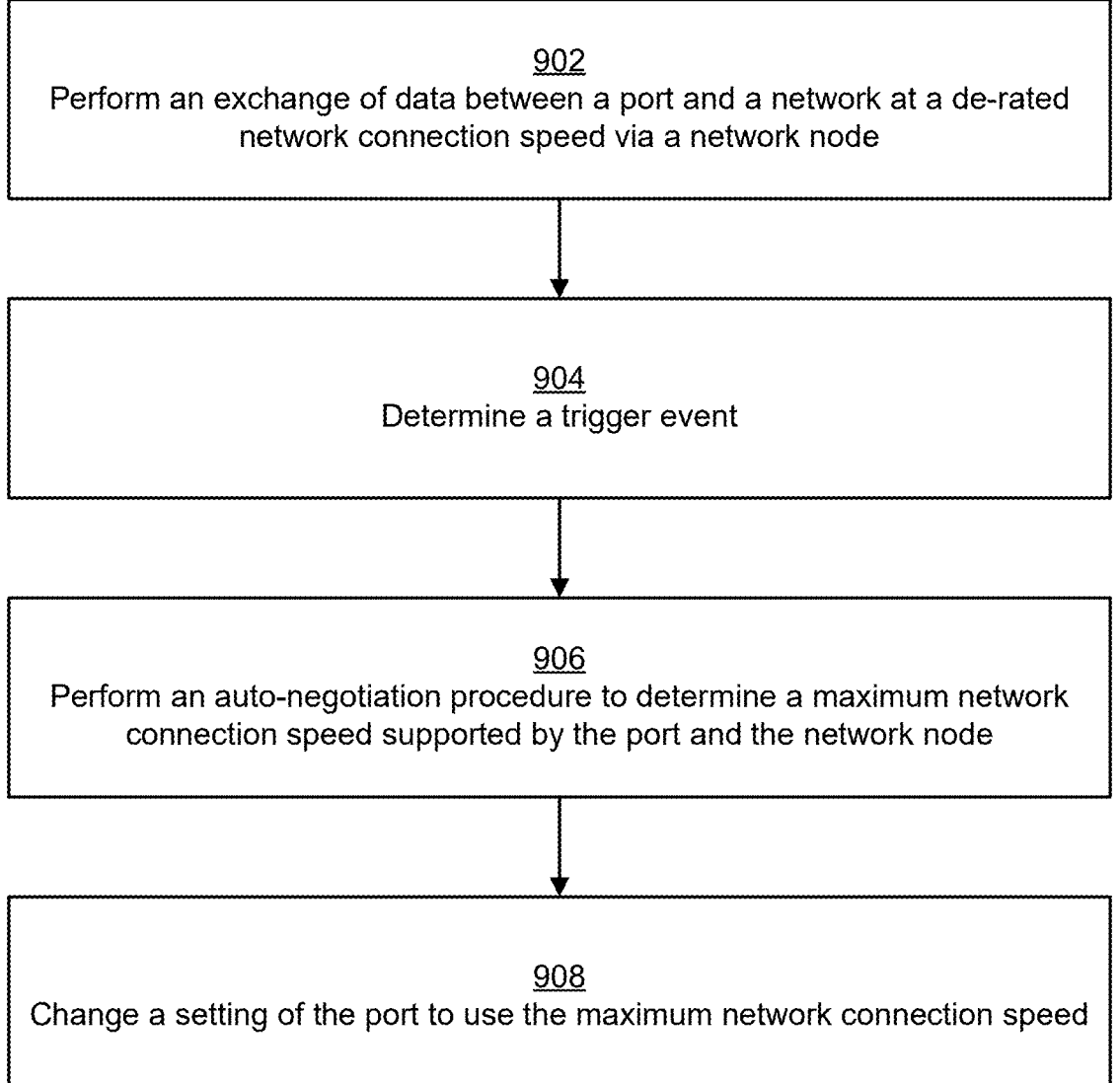
FIG. 9 illustrates an example of a flow for a process of resetting a network connection speed for a port according to embodiments of the present disclosure.

FIG. 9 illustrates an example of a flow for a process of resetting a network connection speed for a port according to embodiments of the present disclosure. In an example, the flow includes operation 902, where the device performs an exchange of data between a port and a network at a de-rated network connection speed via a network node. The device includes the port, which is communicatively connected to the network via the network node. The de-rated network connection speed can be determined based on the process described in FIG. 8.

In an example, the flow includes operation 904, where the device determines a trigger event. The trigger event can involve one or more of a device reboot, a device firmware update, a re-plugging of a network cable into the port, or a disablement of an operational mode of the device. The device may receive an indication of the trigger event or may detect the trigger event based on the exchange of data.

In an example, the flow includes operation 906, where the device performs an auto-negotiation procedure to determine a fastest network connection speed supported by the port and the network node. Performing the auto-negotiation procedure is according to the IEEE 802.3 standard and involves the device sending first information about first network connection speeds that the port supports to the network node and receiving second information from the network node about second network connection speeds that the network node supports. The device selects the first network connection from the first network connection speeds as a fastest network connection speed indicated by the second information as being supported by the network node.

In an example, the flow includes operation 908, where the device changes a setting of the port to use the fastest network connection speed. Data is then exchanged between the port and the network based on this setting.

Figure 10:
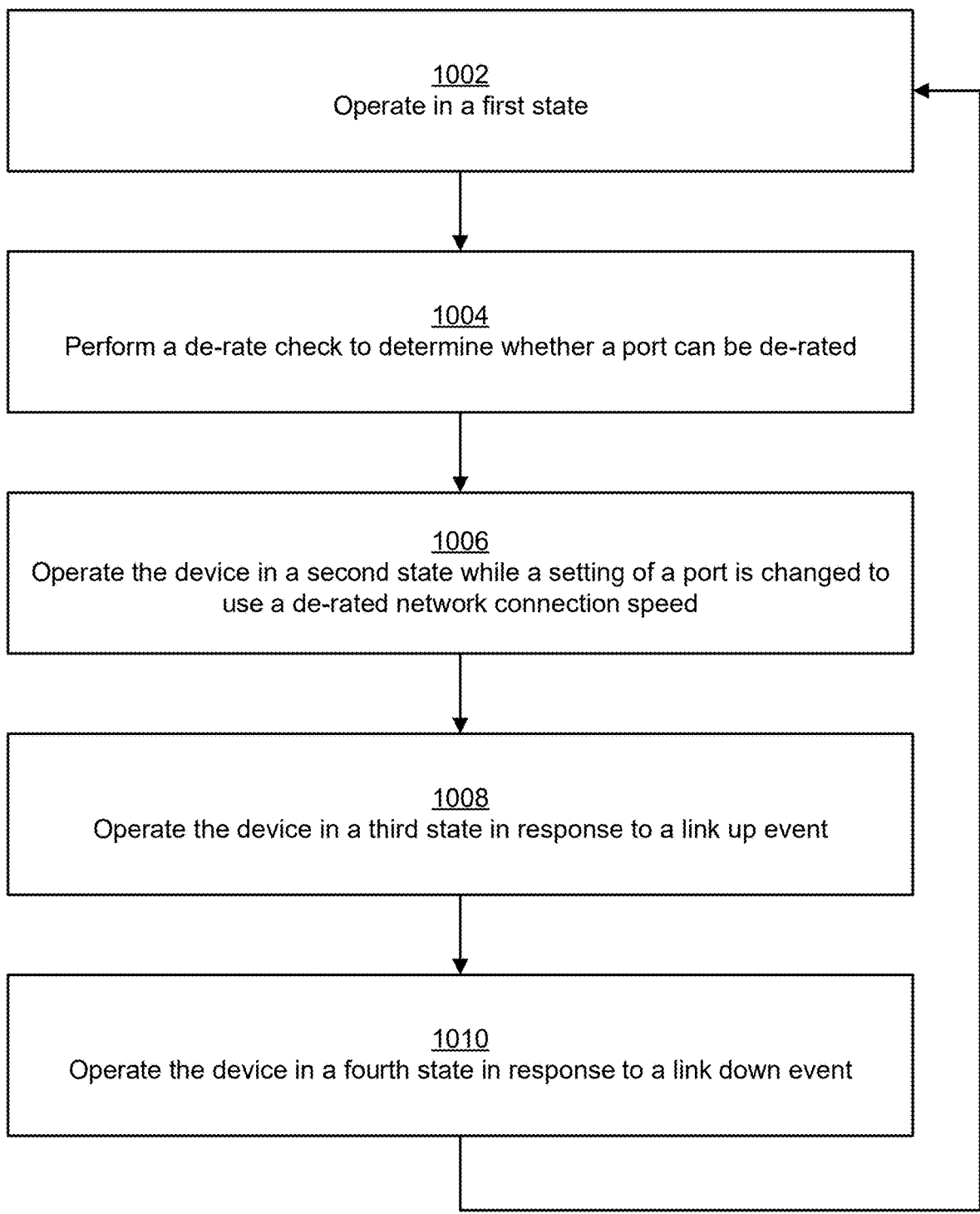
FIG. 10 illustrates an example of a flow for a process of using a state machine to de-rate and reset a network connection speed for a port according to embodiments of the present disclosure.

FIG. 10 illustrates an example of a flow for a process of using a state machine to de-rate and reset a network connection speed for a port according to embodiments of the present disclosure. In an example, the flow includes operation 1002, where the device operates in a first state. The device can be a gateway with a port communicatively coupled to a network via a network node. The first state may be a normal state in which a setting of the port is set to a fastest network connection speed that is supported by the port and the network node.

In an example, the flow includes operation 1004, where the device performs a de-rate check to determine whether the port can be de-rated. The de-rate check involves a de-rate event in which the device determines whether conditions are satisfied for de-rating the connection speed. Examples of the conditions are described herein above in connection with FIG. 6.

In an example, the flow includes operation 1006, where the device operates in a second state while a setting of the port is changed to use a de-rated network connection speed. The second state can be a de-rating state during which an auto-negotiation procedure is performed to determine the de-rated network connection speed, which is slower than the fastest network connection speed.

In an example, the flow includes operation 1008, where the device operates in a third state in response to a link up event. The third state can be a de-rated state during which data is exchanged between the port and the network based on a port's setting using the de-rated network connection speed.

In an example, the flow includes operation 1010, where the device operates in a fourth state in response to a link down event. The link down event may be the port being disconnected from the network or power optimization being disabled for the event. So, in response, the device can return to communicating with the network at the fastest network connection speed. As such, the fourth state can be a resetting state during which the auto-negotiation procedure is performed to determine the fastest network connection speed. The flow then returns to operation 1002, where the device operates in the first state.

Figure 11:
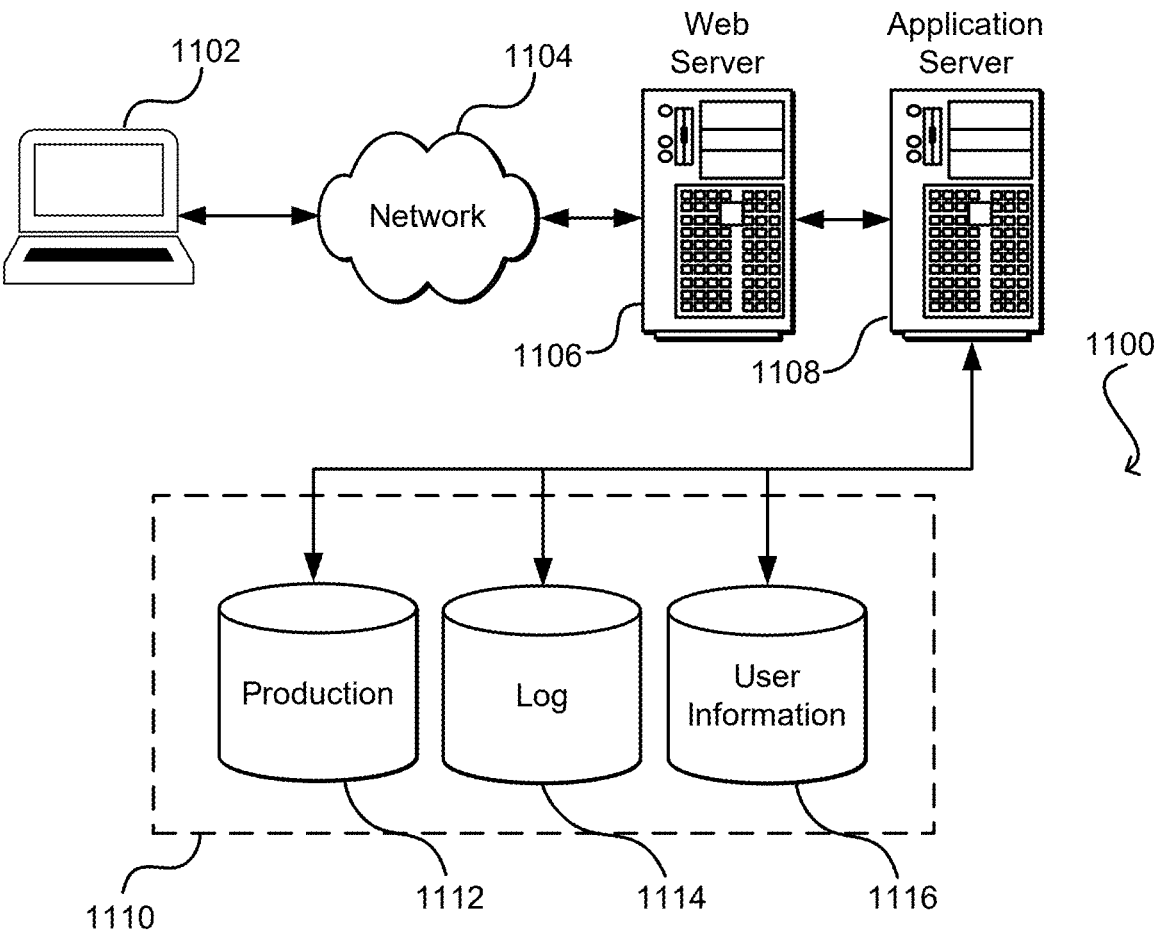
FIG. 11 illustrates an environment in which various embodiments can be implemented.

FIG. 11 illustrates aspects of an example environment 1100 for implementing aspects in accordance with various embodiments. As will be appreciated, although a Web-based environment is used for purposes of explanation, different environments may be used, as appropriate, to implement various embodiments. The environment includes an electronic client device 1102 (an example of the device 110), which can include any appropriate device operable to send and receive requests, messages, or information over an appropriate network 1104 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 1106 for receiving requests and serving content in response thereto, although for other networks an alternative device serving a similar purpose could be used as would be apparent to one of ordinary skill in the art.

The illustrative environment includes at least one application server 1108 and a data store 1110. It should be understood that there can be several application servers, layers, or other elements, processes, or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device, handling a majority of the data access and business logic for an application. The application server provides access control services in cooperation with the data store and is able to generate content such as text, graphics, audio, and/or video to be transferred to the user, which may be served to the user by the Web server in the form of HyperText Markup Language ("HTML"), Extensible Markup Language ("XML"), or another appropriate structured language in this example. The handling of all requests and responses, as well as the delivery of content between the client device 1102 and the application server 1108, can be handled by the Web server. It should be understood that the Web and application servers are not required and are merely example components, as structured code discussed herein can be executed on any appropriate device or host machine as discussed elsewhere herein.

The data store 1110 can include several separate data tables, databases or other data storage mechanisms and media for storing data relating to a particular aspect. For example, the data store illustrated includes mechanisms for storing production data 1112 and user information 1116, which can be used to serve content for the production side. The data store also is shown to include a mechanism for storing log data 1114, which can be used for reporting, analysis, or other such purposes. It should be understood that there can be many other aspects that may need to be stored in the data store, such as for page image information and to access right information, which can be stored in any of the above listed mechanisms as appropriate or in additional mechanisms in the data store 1110. The data store 1110 is operable, through logic associated therewith, to receive instructions from the application server 1108 and obtain, update or otherwise process data in response thereto. In one example, a user might submit a search request for a certain type of item. In this case, the data store might access the user information to verify the identity of the user and can access the catalog detail information to obtain information about items of that type. The information then can be returned to the user, such as in a results listing on a Web page that the user is able to view via a browser on the user device 1102. Information for a particular item of interest can be viewed in a dedicated page or window of the browser.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 11. Thus, the depiction of the system 1100 in FIG. 11 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS"), and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including Hypertext Transfer Protocol ("HTTP") servers, FTP servers, Common Gateway Interface ("CGI") servers, data servers, Java servers, and business application servers. The server(s) also may be capable of executing programs or scripts in response to requests from user devices, such as by executing one or more Web applications that may be implemented as one or more scripts or programs written in any programming language, such as Java®, C, C#, or C++, or any scripting language, such as Perl, Python, or TCL, as well as combinations thereof. The server(s) may also include database servers, including without limitation those commercially available from Oracle®, Microsoft®, Sybase, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired)), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory ("EEPROM"), flash memory or other memory technology, Compact Disc Read-Only Memory ("CD-ROM"), digital versatile disk (DVD), or other optical storage, magnetic cassettes, magnetic tape, magnetic disk storage, or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method comprising:

sending, to a first device communicatively coupled with a second device, first information indicating first network connection speeds supported by the second device;

configuring the second device to use a first network connection speed of the first network connection speeds;

determining a second network connection speed that represents an actual network connection speed of a data exchange between the first and second devices;

determining, based at least in part on a first mode of the second device, a third network connection speed of the first network connection speeds, the third network connection speed being faster than or equal to the second network connection speed and being slower than the first network connection speed, the first mode being associated with reducing power consumption of the second device and triggering a determination of the third network connection speed based at least in part on the second network connection speed being lower than the first network connection speed;

sending, to the first device, second information indicating that the third network connection speed is to be used; and configuring the second device to use the third network connection speed.

2. The computer-implemented method of claim 1, further comprising:

receiving, via a user interface of the second device, an input activating the first mode of the second device, the first mode causing use of the third network connection speed.

3. The computer-implemented method of claim 1, further comprising:

performing, by the second device at a first time, an auto-negotiation procedure with the first device according to the Institute of Electrical and Electronics Engineers (IEEE) 802.3 standard, wherein the first network connection speed corresponds to a fastest network connection speed that both the second device and the first device indicate as being supported; and performing, by the second device at a second time after the first time, the auto-negotiation procedure with the first device, wherein the second information is sent during the auto-negotiation procedure and indicates that the third network connection speed is the fastest supported network connection speed.

4. The computer-implemented method of claim 1, further comprising:

performing, by the second device at a first time, an auto-negotiation procedure with the first device according to the Institute of Electrical and Electronics Engineers (IEEE) 802.3 standard, wherein performing the auto-negotiation procedure at the first time comprises advertising all the first network connection speeds; and performing, by the second device at a second time after the first time, the auto-negotiation procedure with the first device, wherein performing the auto-negotiation procedure at the second time comprises advertising only the third network connection speed or advertising only the third network connection speed and one or more network connection speeds slower than the third network connection speed.

5. The computer-implemented method of claim 1, further comprising:

receiving, by the second device via a user interface associated with the second device, an input indicating a time window associated with an auto-negotiation procedure; and performing, by the second device during the time window, the auto-negotiation procedure by at least sending the second information to the first device.

6. The computer-implemented method of claim 1, wherein the data exchange is via a port of the second device, and further comprising:

determining, by the second device, that a status of the port indicates that the port is idle; and performing, by the second device based at least in part on the status, an auto-negotiation procedure by at least sending the second information to the first device.

7. The computer-implemented method of claim 1, further comprising:

performing, by the second device, after the first network connection speed is selected, a first network connection speed test, wherein the first network connection speed test indicates the second network connection speed;

performing, by the second device, a second network connection speed test, the second network connection speed test indicating a fourth network connection speed;

determining, by the second device, that a predefined number of network connection speed tests has been performed; and determining, by the second device, that the third network connection speed is a slowest network connection speed that is supported by the first device and the second device and that is faster than the second network connection speed and the fourth network connection speed.

8. The computer-implemented method of claim 1, wherein configuring the second device to use the third network connection speed comprises changing a setting of a port to the third network connection speed, and wherein the computer-implemented method further comprises:

determining, by the second device prior to changing the setting, that the setting has not been changed since the first network connection speed was selected; and determining, by the second device, that the third network connection speed is supported by the first device.

9. A first device comprising:

one or more processors; and one or more memories storing instructions that, upon execution by the one or more processors, configure the first device to:

send, to a second device communicatively coupled with the first device via a port of the first device, first information indicating first network connection speeds supported by the first device;

use a first network connection speed of the first network connection speeds as a setting of the port, the first network connection speeds associated with a first power consumption level of the first device;

determine a second network connection speed that represents an actual network connection speed of a data exchange with the second device;

determine, based at least in part on a first mode, a third network connection speed of the first network connection speeds, the third network connection speed being faster than or equal to the second network connection speed and being slower than the first network connection speed, the third network connection speeds associated with a second power consumption level of the first device, the second power consumption level being smaller than the first power consumption level, the first mode being associated with reducing power consumption of the first device and triggering a determination of the third network connection speed based at least in part on the second network connection speed being lower than the first network connection speed;

send, to the second device, second information indicating that the third network connection speed is to be used; and configure the port to use the third network connection speed.

10. The first device of claim 9, wherein the one or more memories store further instructions that, upon execution by the one or more processors, configure the first device to:

perform, after the first network connection speed is selected, a first network connection speed test, wherein the first network connection speed test indicates the second network connection speed;

store the actual network connection speed as one of a plurality of network connection speed test results; and determine that a first mode of the first device is activated, wherein the first mode is associated with reducing a power consumption of the first device, wherein the second network connection speed is selected based at least in part on the plurality of network connection speed test results and the first mode.

11. The first device of claim 10, wherein the one or more memories store additional instructions that, upon execution by the one or more processors, configure the first device to:

determine third network connection speeds from the plurality of network connection speed test results;

determine a fastest network connection speed from the third network connection speeds; and determine that the third network connection speed is supported by the port and has the closest value among the first network connection speeds to the fastest network connection speed from the third network connection speeds.

12. The first device of claim 10, wherein the one or more memories store additional instructions that, upon execution by the one or more processors, configure the first device to:

determine whether the third network connection speed is supported by the second device, wherein the third network connection speed is selected based at least in part on a determination that the second device supports the second network connection speed.

13. The first device of claim 9, wherein the one or more memories store further instructions that, upon execution by the one or more processors, configure the first device to:

determine, after the third network connection speed is selected, a trigger event, wherein the trigger event includes at least one of: a device reboot, a device firmware update, a re-plugging of a network cable into the port, or a disablement of an operational mode of the first device; and perform, based at least in part on the trigger event, an auto-negotiation procedure according to the Institute of Electrical and Electronics Engineers (IEEE) 802.3 standard by at least re-sending the first information to the second device.

14. The first device of claim 9, wherein the one or more memories store further instructions that, upon execution by the one or more processors, configure the first device to:

determine that that a status of the port indicates that the port is idle, wherein the port is a first local area network (LAN) port communicatively coupled with a second LAN port of the second device; and perform, based at least in part on the status, an auto-negotiation procedure according to the Institute of Electrical and Electronics Engineers (IEEE) 802.3 standard by at least sending the second information to the second device.

15. The first device of claim 9, wherein the first device comprises a plurality of ports, wherein the third network connection speed is selected based at least in part on an auto-negotiation procedure performed for the port only.

16. The first device of claim 9, wherein the one or more memories store further instructions that, upon execution by the one or more processors, configure the first device to:

cause the first device to operate in a first state after the first network connection speed is selected and while the second network connection speed is determined and while the third network connection speed is selected;

cause the first device to operate in a second state while the setting of the port is changed; and cause the first device to operate in a third state after the setting of the port is changed.

17. The first device of claim 16, wherein an auto-negotiation procedure according to the Institute of Electrical and Electronics Engineers (IEEE) 802.3 standard is performed while the first device is operated in the second state, and wherein no network connection speed tests are performed while the first device is operated in the third state.

\* \* \* \* \*